May 29, 1956 R. W. FOREMAN 2,747,399
STATIC YIELD POINT MEASUREMENT
Filed Aug. 12, 1953
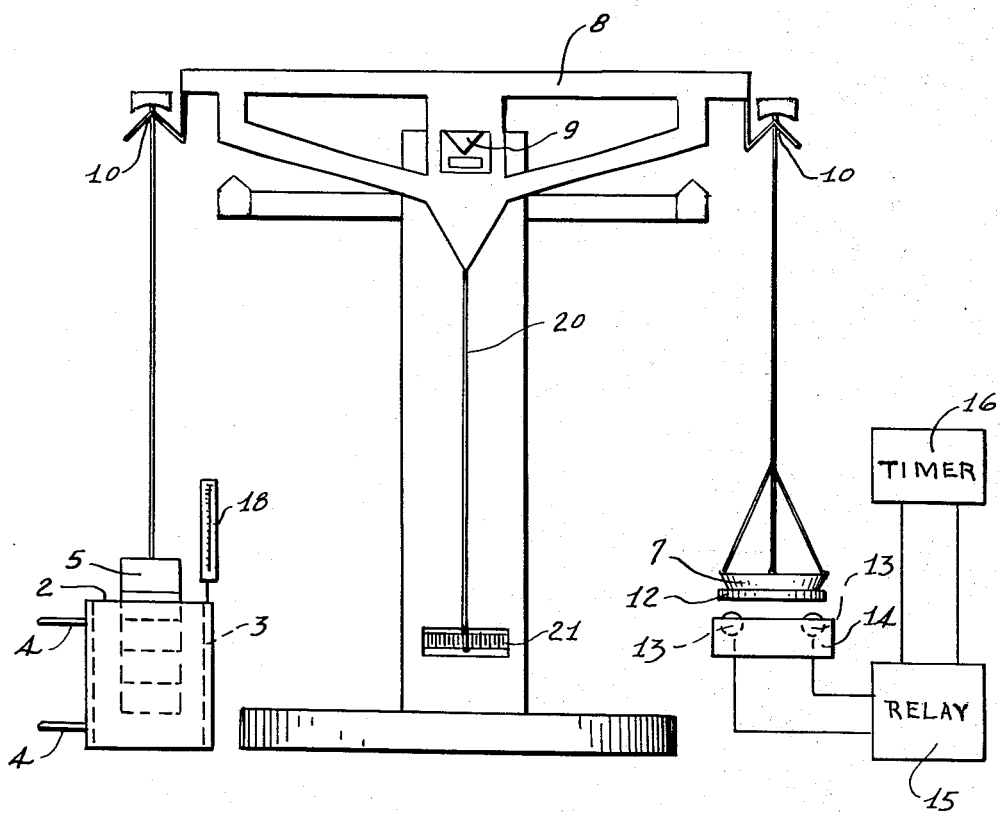
ROBERT W. FOREMAN,
INVENTOR.
BY Oberlin & Limbach
attys.

United States Patent Office 2,747,399
Patented May 29, 1956

2,747,399

STATIC YIELD POINT MEASUREMENT

Robert W. Foreman, Cleveland, Ohio, assignor to The Standard Oil Company, Cleveland, Ohio, a corporation of Ohio Application August 12, 1953, Serial No. 373,830

4 Claims. (Cl. 73—57)

The static yield value of a substance such as a lubricating grease, or material having similar characteristics as regards resistance to flow, is defined as the lowest shear stress at which the material will begin to flow. Attempts at measuring yield point in the past have had the common fault that they do not give force and stress readings in fundamental units. This is a serious drawback, since it permits materials to be compared on an empirical basis only. No comparing in fundamental units, dynes/cm.$^2$, has been available. Some attempt has been made to use the rotating viscometer, but this does not measure "static" yield point in fact. What it measures is a "dynamic" yield point. As pointed out by Green and Weltmann Anal. Chem. 18, 167 (1946), in describing the determination of yield stresses of thixotropic oils, "Stirring * * * does break down the initial static yield value, but this takes place so rapidly that no record of the breakdown is shown when the (rotating) viscometer is hand-operated. The yield value actually appearing in the consistency curve is a dynamically determined one. The dynamic yield value is near the point where the velocity of structural breakdown is equal to the velocity of the buildup. The static yield value is that which exists before the material has been touched by any stirring device."

In accordance with the present invention, an apparatus and method is available to measure the yield value of lubricating greases, etc., under static conditions, and give this value in fundamental units, i. e., dynes/cm.$^2$. And accuracy and consistent reproducibility of results may thus be had, and withal, by application of relatively simple and low cost technique. Other objects and advantages will appear from the following description.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing the sole figure is a side elevational, partly schematic view of apparatus in accordance with the invention.

In general, the sample to be examined is provided in a container suitable for room temperature operation, or operation at a desired higher temperature, and a stainless steel plate with negligible edge area is immersed in the sample and is exactly counterbalanced by weight pan means, and movement of the steel plate in the sample is detected by an electric control means including a timer which is stopped after allowing a movement of a selected small distance to occur. Thus, a sample container 2 is involved, and this may be a plain receptacle, or preferably one equipped with a jacket 3 having connections 4 for steam or other temperature-adjusting medium. An elongated flat stainless steel plate 5, with substantially no edge area, is immersed in the sample of the material in such container. A weight-receiving pan 7 is also provided, and this counterbalances with the steel plate 5 by some suitable balancing means, here illustrated by a beam 8 with knife edge 9, as in analytic balance practice, and provided with a pointer 20 which travels over an indicating scale 21; the plate 5 and weight-receiving pan 7 being suspended from the ends of the beam 8 on knife edges 10. The pan is arranged to control an electric circuit, and while the bottom of the pan per se may be employed for this, it is preferable to have a copper plate 12 attached to the bottom of the pan, such plate being specially surfaced to provide accurate and uniform contact with two spaced mercury pools 13 in a suitable container 14, these pools being in an electric circuit through a relay 15 to an electric timer 16.

The process of measuring and evaluating samples may be applied for either determining the actual yield point of greases or the like, or for performing control tests.

For example: To carry out a control test, wherein a specification has been set up for the minimum yield point for a particular grease, a sample of the lubricating grease is supplied in the sample-container, and this is set in a vacuum desiccator and the air content is evacuated. With the container in position to receive the steel test plate, the latter is immersed in the grease at the side of the container first and is then moved carefully edgewise to the middle to avoid non-uniform shearing of the sample. The plate area contacting the sample is controlled by always immersing the plate to the same level, which as a standard may be chosen for instance to be such that the area covered by the sample is 13.6 cm.$^2$. After thus inserting the test plate, the sample is allowed to stand for at least twenty minutes before any measurements are taken. Weights are added to the pan just slightly less than the specification yield point. If this compresses the pan to the 3 mm. usual standard space at starting between the pan and the mercury pools, such as to close the electric circuit therewith, the sample has too low a yield point and is rejected. An acceptable sample should require addition of weights to equal the yield point required by the specification.

As another example: To measure for determining the actual yield point of a sample, weights are progressively added to the pan until movement of the plate in the sample allows electric contact to be made with the mercury pools. Then the steel plate is moved to a new, unsheared portion of the sample, and a slightly lower weight is now added to the pan (e. g. about 0.1 gram less). The time for bringing about electrical contact is recorded, and if it is only a few minutes, the weights are reduced further, until contact time is about one hour. This is the practicable time, of avoiding possibility of poor reproducibility. A longer time is not necessary. Yield stress is found to change only very slightly with time.

Static yield points are affected by temperature, and accordingly a standardized temperature must be adhered to for all measurements. Some greases and materials however show similar yield stress at room temperature and at 210° F., but others show a lower yield stress at the higher temperature. In general, room temperature, and 210° F. respectively, are suitable operating temperatures. The higher temperature is controlled by the heating jacket, and this may be provided with a thermometer 18. The accuracy of this method is the result of the fact that yield force (dynes) is a linear function of plate immersion area.

Other modes of applying the principle of the invention may be employed, change being made as regards the details described, provided the features stated in any of the following claims or the equivalent of such be employed.

I therefore particularly point out and distinctly claim as my invention:

1. In material testing apparatus of the character described, an open top container for the material to be examined, said container being equipped with a jacket for the flow of a temperature adjusting medium thereabout, an adjustable balance adjacent the container, a stainless steel plate having negligible edge area suspended from one end of said balance in a vertical plane, the plate being thus held generally centrally within the container for immersion in the material, a horizontally oriented weight-receiving pan suspended from the other end of said balance, an electrical contact member carried by said pan for movement with the same, a switch comprising exposed and spaced-apart mercury pools positioned normally at a predetermined distance beneath said contact member, an electrically operated clock timer, and circuit control means for said clock including connections to said mercury pools, said control means being operative to interrupt energization of the timer when lowering of the pan causes the contact member to engage and electrically bridge the mercury pools.

2. In material testing apparatus of the character described, an open top container for the material to be examined, said container being equipped with a jacket for the flow of a temperature adjusting medium thereabout, an adjustable balance adjacent the container, a stainless steel plate having negligible edge area suspended from one end of said balance in a vertical plane, the plate being thus held within the container for immersion in the material, a horizontally oriented weight-receiving pan suspended from the other end of said balance, a first electrical contact member carried by said pan for movement therewith, a cooperable second electrical contact in the form of a mercury pool beneath and normally spaced from the first contact member, an electrically operated clock timer, and circuit means including said first and second contact members for controlling the timer in response to the engagement of such contacts upon lowering of the pan and hence the first contact member.

3. In material testing apparatus of the character described, an open top container for the material to be examined, an adjustable balance adjacent the container, a flat metal plate having negligible edge area suspended from one end of said balance in a vertical plane, the plate being thus held within the container for immersion in the material, a weight-receiving member suspended from the other end of said balance, electrically-operated time-indicating means, and a control switch for said time-indicating means including contacts spaced beneath and adapted to be bridged by said weight-receiving member, the operation of said time-indicating means thereby being responsive to lowering of such member into engagement with the switch contacts.

4. In material testing apparatus of the character described, an open top container for the material to be examined, an adjustable balance adjacent the container, a flat metal plate having negligible edge area suspended from one end of said balance in a vertical plane, the plate being thus held within the container for immersion in the material, a weight-receiving member suspended from the other end of said balance, time-indicating means, and electric circuit means operative to control said time-indicating means in response to predetermined vertical movement of said weight-receiving member.

References Cited in the file of this patent

UNITED STATES PATENTS

| | | |
|---|---|---|
| 1,785,521 | Mackin | Dec. 16, 1930 |
| 1,894,369 | Duffing | Jan. 17, 1933 |
| 2,156,407 | Stewart | May 2, 1939 |
| 2,345,968 | Green | Apr. 4, 1944 |

FOREIGN PATENTS

| | | |
|---|---|---|
| 16,997 | Great Britain | May 2, 1912 |